Oct. 20, 1970 R. HAKNER 3,534,582
AUTOMATIC STAMPING MECHANISM FOR PROGRESSIVE
STAMPING OF METAL ARTICLES
Filed Sept. 25, 1967 5 Sheets-Sheet 2
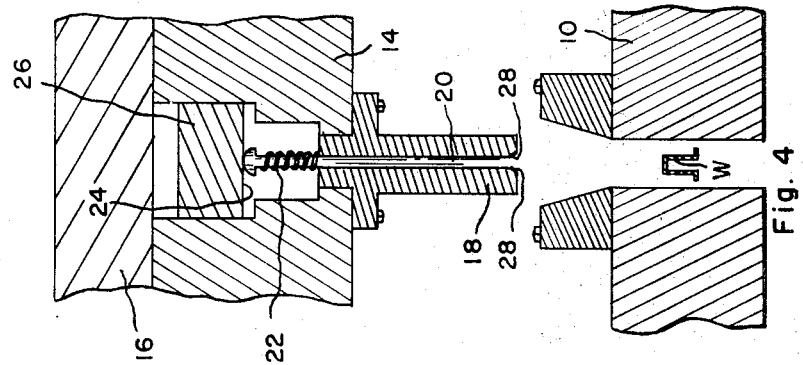
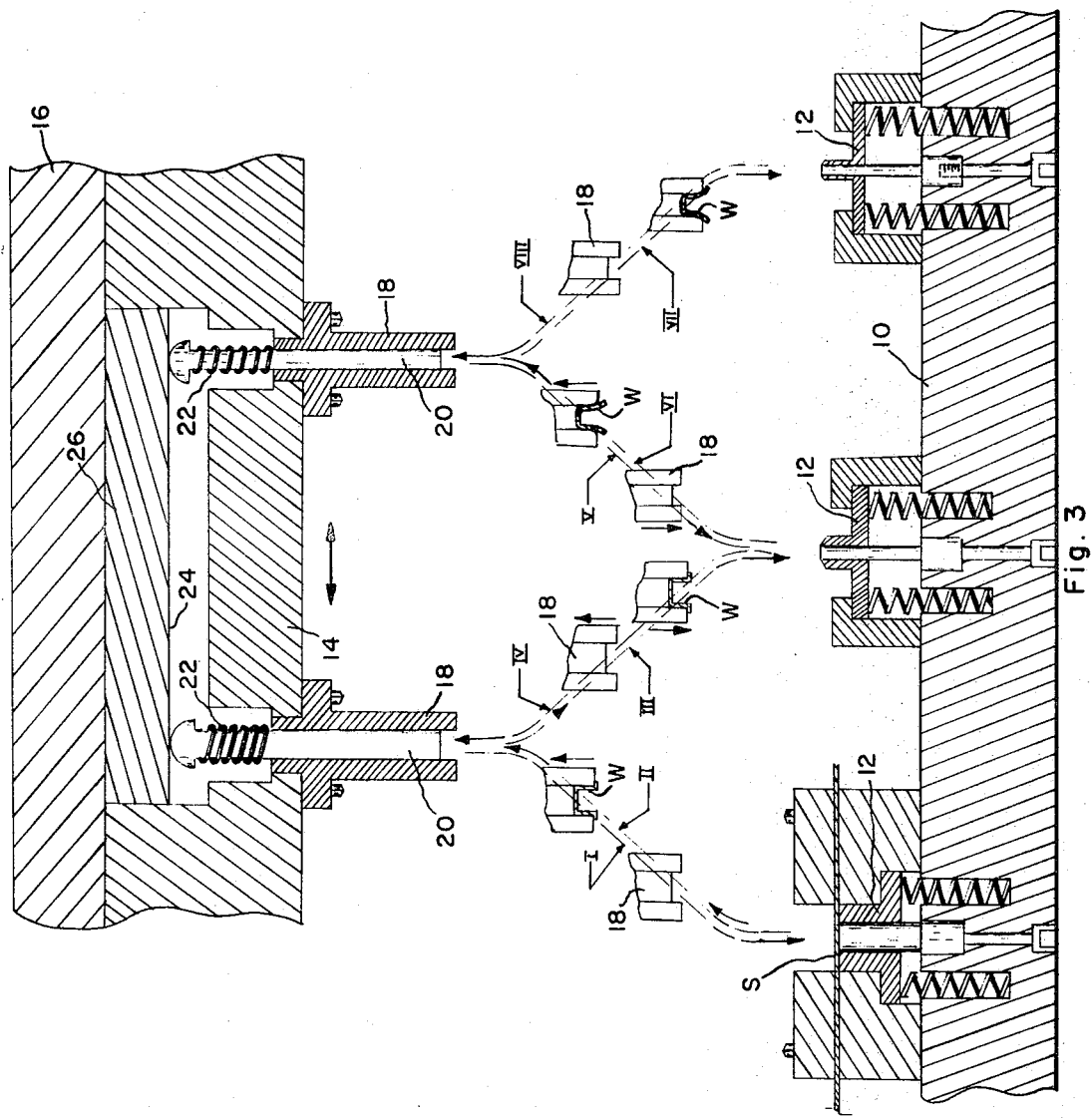
INVENTOR
ROBERT HAKNER
BY Alfred E. Miller
ATTORNEY

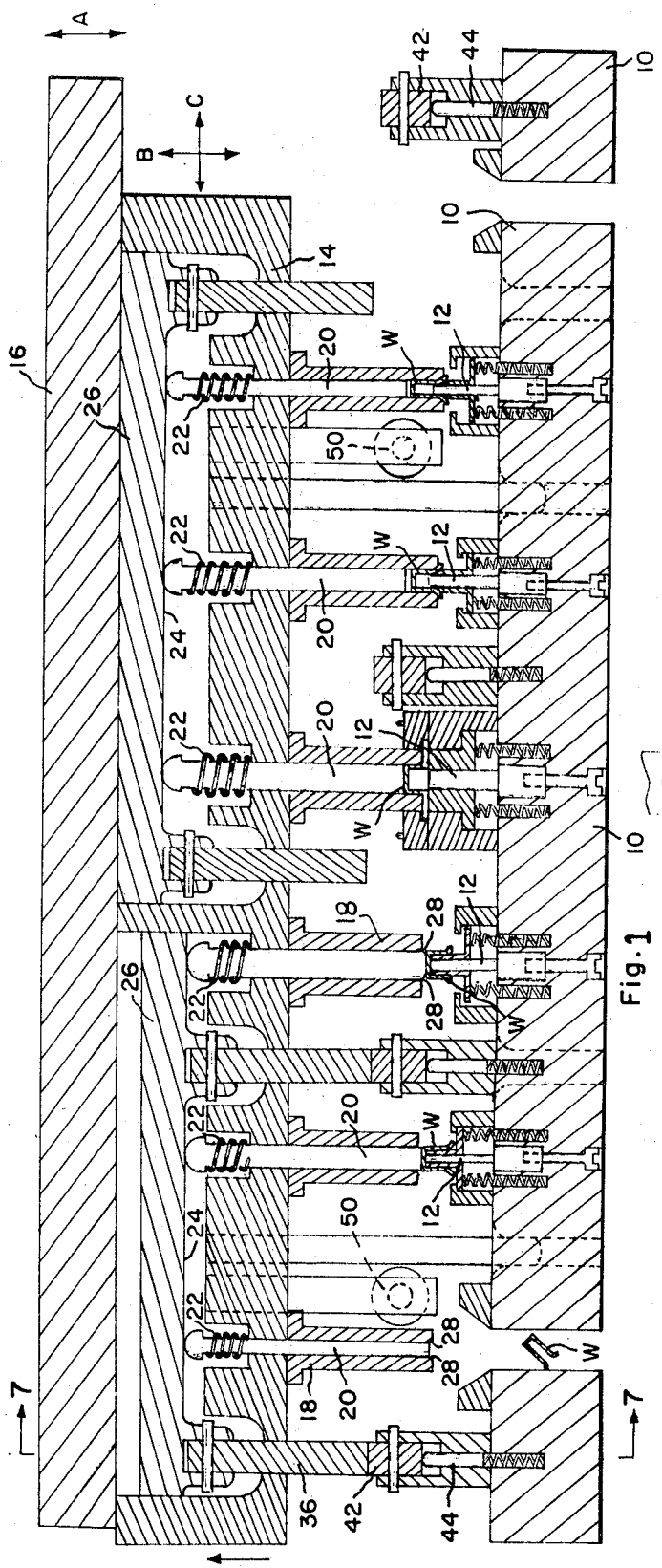
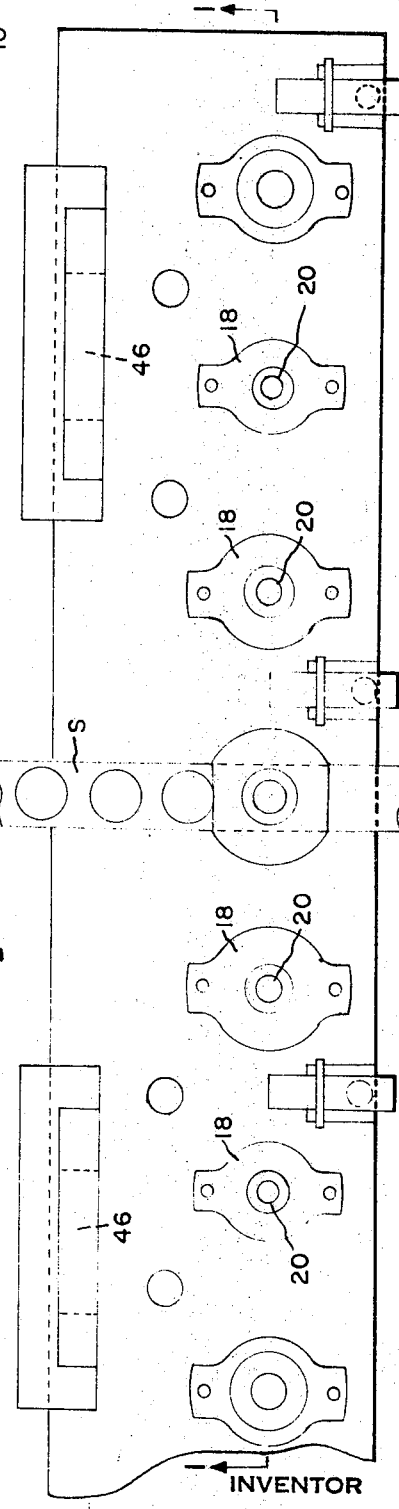
Fig. 1
Fig. 2

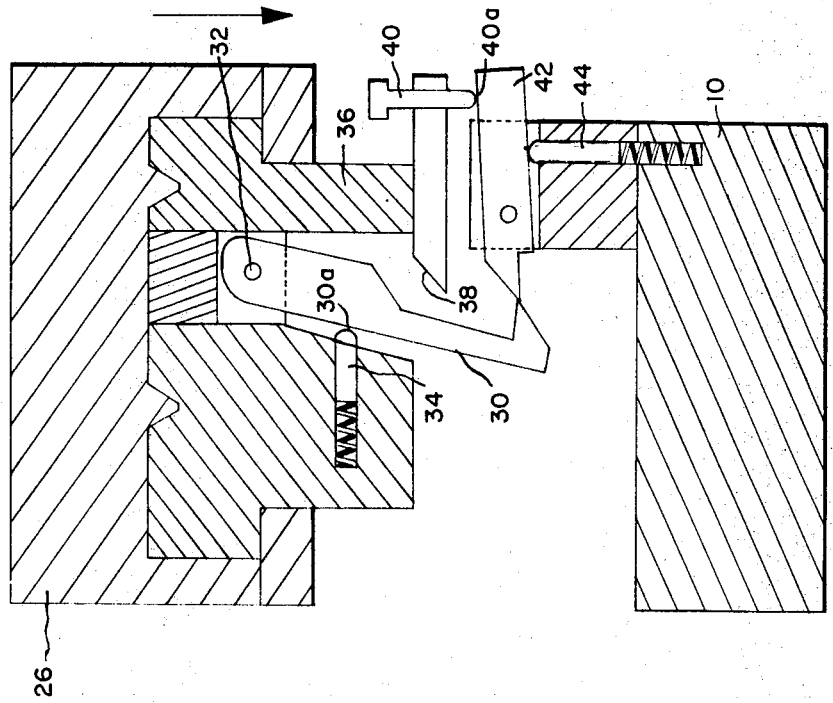
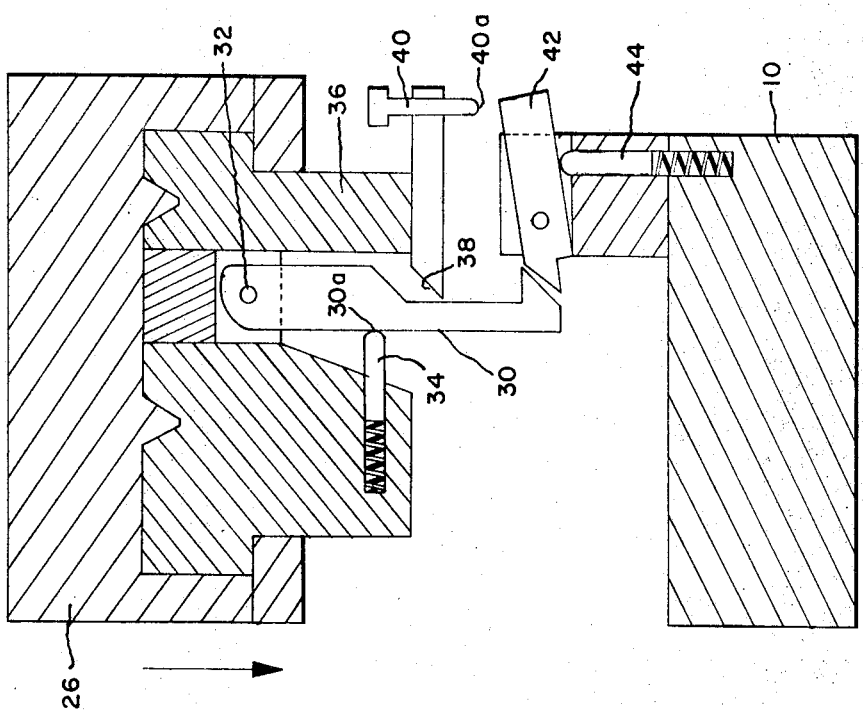

INVENTOR
ROBERT HAKNER
BY Alfred E. Miller
ATTORNEY

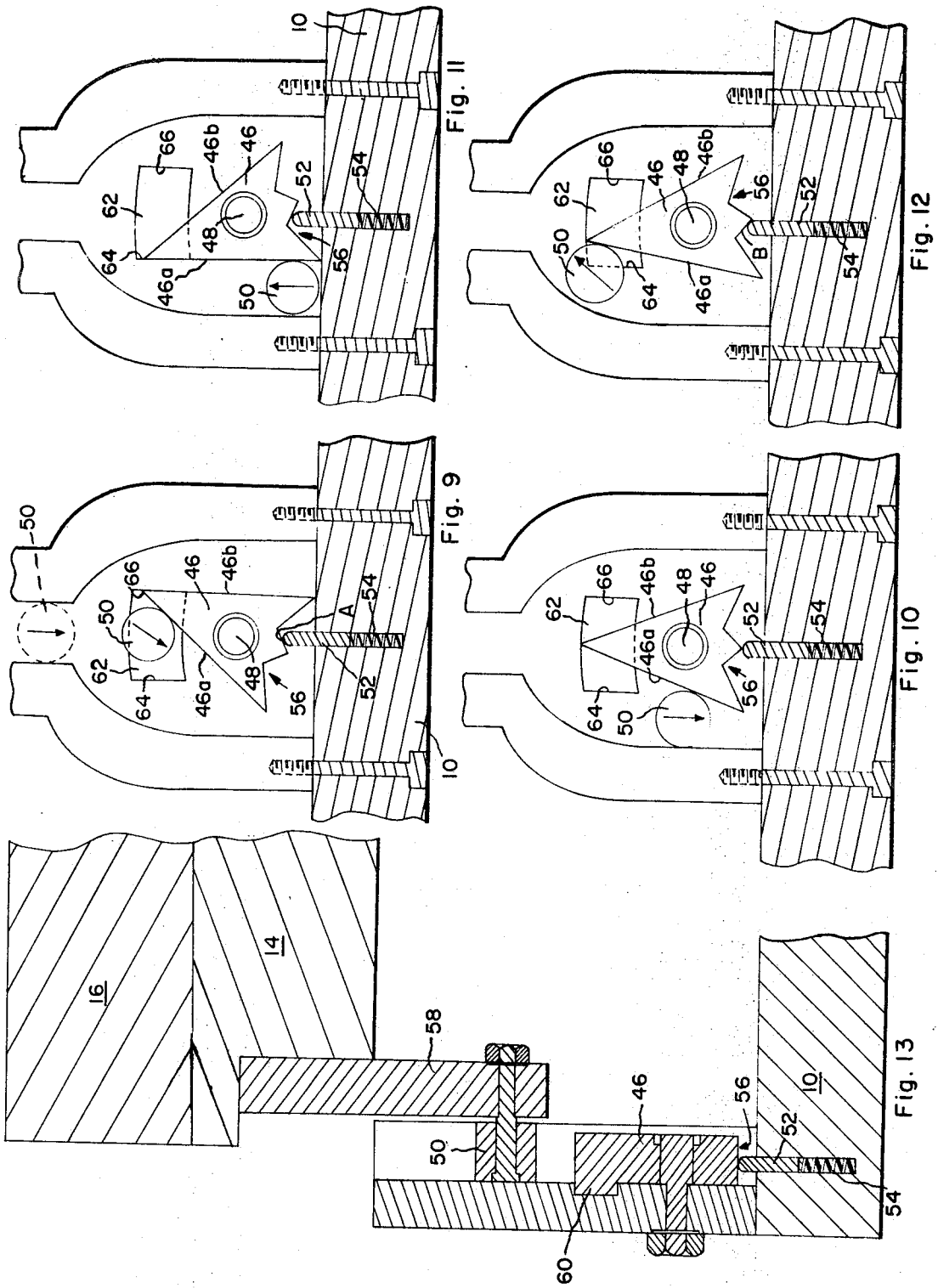

United States Patent Office 3,534,582
Patented Oct. 20, 1970

3,534,582
AUTOMATIC STAMPING MECHANISM FOR PROGRESSIVE STAMPING OF METAL ARTICLES
Robert Hakner, 182 E. 19th St., Brooklyn, N.Y. 11232
Filed Sept. 25, 1967, Ser. No. 670,288
Int. Cl. B21j 11/00, 13/04
U.S. Cl. 72—405         2 Claims

ABSTRACT OF THE DISCLOSURE

An automatic stamping mechanism for progressive stamping of metal articles which require more than one operation performed thereon. The tools that perform the stamping also transfer the stampings to consecutive stages periodically for further processing.

---

This invention relates to a mechanical device and method for automatic stamping of metals. However, the present invention may be employed on other suitable materials.

The principal object of the present invention is the provision of a novel transfer die set for automatically stamping of articles from a metal strip as well as prefabricated articles, i.e. blank, cup etc. fed in manually or by a hopper and transferring said articles to consecutive stages of operations without the use of auxiliary devices and without using a metal strip as a transfer ribbon. In the present invention the working elements of the apparatus such as the punches or dies not only mechanically operate on the article but also function as transfer devices to move the articles or work from one operation to the next successive positions for the next operation.

It is a further object of my present invention to provide a novel device having punches or dies that reciprocate with either a linear motion or a rotary motion between one stage and the successive stage of the stamping operation. It should be apparent that the same principle of operation may be applied to many mechanical operations on work pieces, for example; blanking, drawing, forming, trimming, piercing, notching, laminating, and marking. In addition, stamping of two or more parts simultaneously from the same directions or different directions may be accomplished with the present device using the same or separate metal feeds. The latter, of course, will increase the production capacities of my novel device and also facilitate assembly of parts of a product, for example, hinges.

Another object of the present invention is the provision of novel cam-operated devices or other suitable devices for converting the ordinary vertical motion of the punch holder to lateral motion thereby moving the punch holder and the punches therein from one operative position to another.

A further object of the present invention is to provide a latching mechanism for removably attaching the punch holder to the die bed during the punching operation of the present apparatus.

The above and other features, objects and advantages of the present invention will be fully understood from the following description considered in connection with the accompanying illustrative drawings.

FIG. 1 is a partly sectional and a partly elevational view of the device for automatic stamping of metals constructed in accordance with the teachings of my invention, taken along lines 1—1 of FIG. 2.

FIG. 2 is a top plan view of the present device for automatic stamping of metals.

FIG. 3 is a partial sectional view thereof showing diagrammatically the movement of the punch or tool of the device.

FIG. 4 is partial sectional view thereof showing the ejector mechanism in detail.

Figure 8:
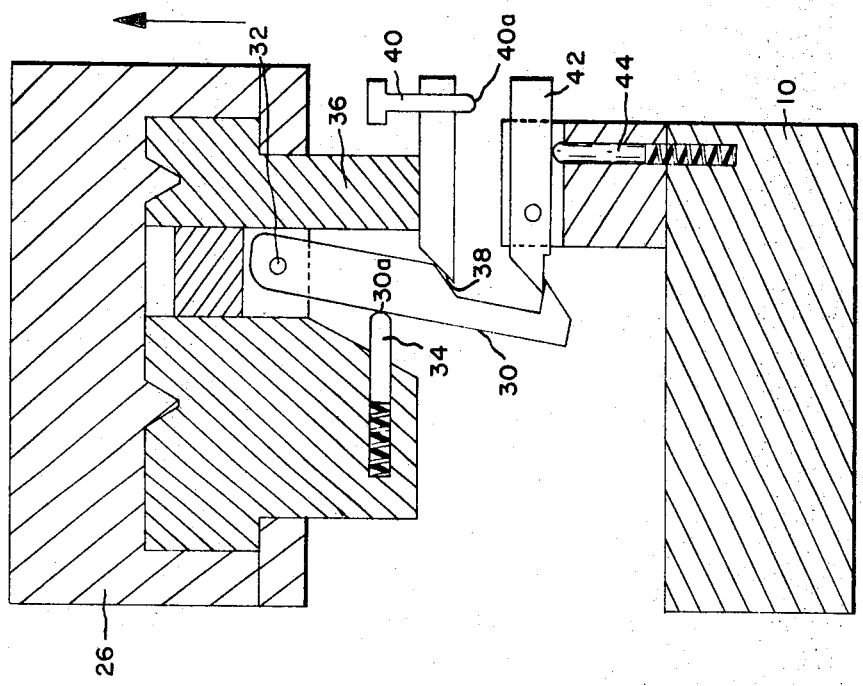

FIGS. 5, 6, 7, and 8 are sectional views of the latching mechanism illustrating the various positions thereof during operation of the present device.

FIGS. 9, 10, 11, and 12 are partial sectional and partial elevational views of the cam and roller mechanism for effecting the lateral movement of the punch or tool.

FIG. 13 is a sectional view of the construction illustrated in FIGS. 9–12.

Referring to the drawings, the apparatus for progressive stamping of metals and other materials comprises a die bed 10 provided with a plurality of spaced, progressive dies 12 of the type well known in the art.

A punch or tool holder 14 is positioned above the die bed 10 and is supported by a punch or tool holder carrier 16. The latter is connected to the ram of the press (not shown) and is adapted to move vertically as illustrated by arrow A. On the other hand, the punch holder 14 is adapted to move vertically as illustrated by the arrow B and horizontally or laterally as illustrated by the arrow C. Located in the punch holder 14 is a series of hollow punches 18. The punches 18 are of a different diameters and/or configurations corresponding to the particular operation to be performed on each of the articles W by the particular punch. In addition, each punch 18 is provided with a punch stripper 20 in the form of a rod movable vertically within the hollow punch. Each stripper is also provided with a helical spring 22 that normally urges the punch stripper upwardly and into engagement with the bottom surface 24 of the punch stripper operating bar 26, the latter being adapted to move vertically in the punch holder 14.

The inner ends 28 of each punch 18 are angled at approximately 45° whereby the punched-out articles, when removed from the die, will frictionally adhere to the punch thereby permitting the article to be transferred to the succeeding work station without the use of auxiliary devices, and completely removed from the original metal feed strip.

Referring to FIG. 2, it will be noted that the metal feed strip S is preferably fed into the apparatus at a central location and the initial punching operation performed. Thereafter, the punched article is transferred by the punch itself to the next station when the punch is moved laterally. The punch 18 inserts the article on the next die and the adjacent punch stripper 20 moves down vertically as the punch is elevated to remove the article from the punch. The punch then moves back to its original position in order to punch out the next article out of the metal strip S. Thus, the punch holder reciprocates laterally as well as being adapted to move up and down. Each punch has a dual function, i.e., punching in one stroke, and transferring the work piece to next station in the following stroke.

Figure 7:
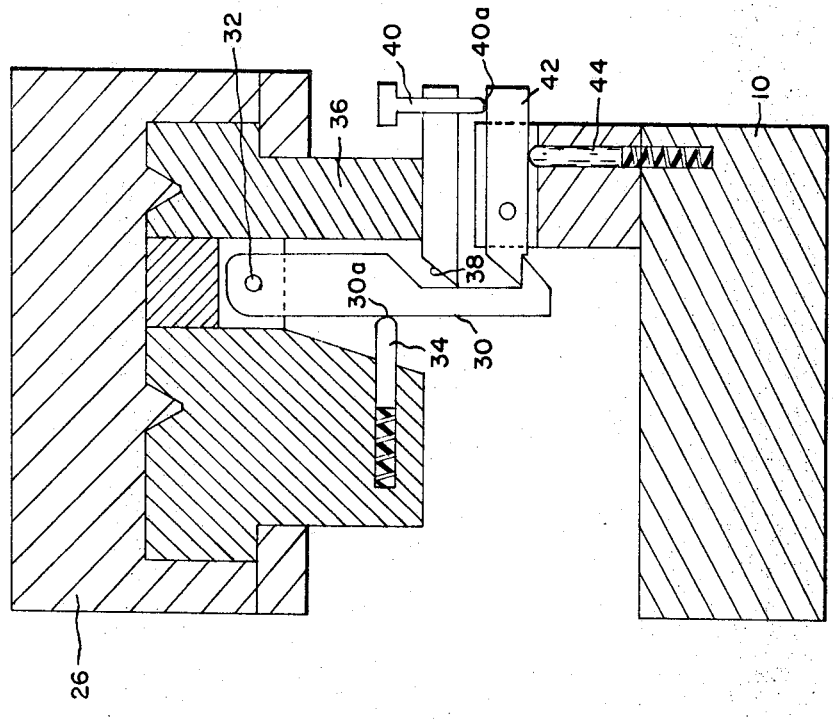

FIGS. 5–8 disclose the latching means for removably attaching the punch stripper operating bar 26 to the die bed 10 during the punching operation and comprises a latch 30 pivoted on pin 32 and normally held in a vertical position by a spring-urged plunger 34 abutting the side surface 30a of the latch 30. Attached in a fixed manner to the bar 26 is a projection 36 having an oblique contact face 38. Inserted transversely in the projection 36 in a pin 40, the bottom end 40a of which is adapted to engage the pivotable catch 42 of the latching mechanism when the bar 26 moves downwardly as shown in FIGS. 5 and 6. The catch 42 is normally urged into a horizontal position by means of another sprin-urged plunger 44. As illustrated, the pin 40 causes the catch 42 to pivot to a substantially horizontal position as seen in FIGS. 6 and 7. Thereafter, the complementary oblique faces of the latch 30 and the catch 42 engage (FIG. 6) and finally the latch 42 clears the projecting oblique face of the latch 30 and the bar 26 and the die bed 10 are interconnected as seen in FIGS. 7 and 8, and when movement of the device is in an upward direction the latch 30 is pivoted out of engagement with latch 42.

The mechanism for moving the punch holder 14 laterally is shown in FIGS. 9–13. This mechanism comprises a cam 46 provited on shaft 48 and a roller 50. A pin 52 mounted on die bed 10 is provided with a spring 54 which normally urges said pin outwardly, the pin engaging the irregular surface 56 of the cam 46. The roller 50 is connected through arm 58 to the punch holder 14. It should be noted that as the punch holder 14 moves downwardly the roller 50 also moves downwardly as shown in FIGS. 9 and 10 and engages the surface 46a of the cam 46 causing the cam to pivot on the shaft 48 and the roller 50 follows the inclined surface 46a to the position shown in FIG. 10 which follows the path I of FIG. 3. The cam 46 is provided with a projecting part 60 (FIG. 13) which is movable in the recess 62 to the stop positions 64 or 66. Thus, the extent of the inverted V-shaped movement of the punch 20 is limited by the stop positions 64 and 66. When the punch holder 14 moves upwardly as seen in FIGS. 11 and 12 the roller 50 forces the cam 46 to pivot slightly and as soon as the roller has cleared the cam 46, the cam snaps back and the roller 50 thereafter engages the surface 46b in the position of the cam 46 as seen in FIG. 11 while the pin 52 moves from position A of FIG. 9 to position B of FIG. 12. Thereafter, roller 50 moves down surface 46b of the cam 46 along the path III of FIG. 3.

As seen in FIG. 3 the punches 18 perform an inverted V-shaped movement. One punch 18 performs one operation along the paths I, II, III, and IV while the other punch 18 performs another operation along the paths V, VI, VII, and VIII. It will be seen that initially the punch 18 stamps out an article from the strip S and the progressive stamping of the article which requires more than one operation performed thereon is subsequently carried out.

The ejector arrangement for a finished article is more particularly shown in FIG. 4 in which the punch stripper 20 in the hollow punch 18 is moved downwardly so that it ejects the article W after completion of the several operations performed thereon.

What is claimed is:

1. An automatic stamping mechanism for progressive stamping of metal articles which require more than one operation performed thereon and in which the same tools that perform the stamping also transfer the articles to successive stages of operation comprising; a die set including a punch holder provided with a plurality of punches, said punch holder having a roller, a die carrier having a plurality of respective dies thereon, means for moving said punch holder substantially vertically, means for moving said punch holder laterally relative to the closing and opening stroke of the operating die including a cam device for changing the direction of said movement of said punch holder periodically in opposite directions with every stroke of said die, said cam device engaging said roller when said punch holder moves vertically to thereby cause said punch to prescribe a movement in the configuration of an inverted V.

2. An automatic stamping mechanism as claimed in claim 1 wherein said means for moving said punch holder moves the latter with both a reciprocating and rotary motion.

References Cited

UNITED STATES PATENTS 2,377,097  5/1945  Norris _____ 72—405

CHARLES W. LANHAM, Primary Examiner

E. M. COMBS, Assistant Examiner

U.S. Cl. X.R.

72—447